United States Patent [19]
Schutt

[11] 3,864,283
[45] Feb. 4, 1975

[54] HYDROCARBON CONVERSION CATALYST
[75] Inventor: Hans U. Schutt, Houston, Tex.
[73] Assignee: Shell Oil Company, Houston, Tex.
[22] Filed: Oct. 19, 1972
[21] Appl. No.: 298,920

[52] U.S. Cl. ............................. 252/455 Z, 208/111
[51] Int. Cl.............................................. B01j 11/40
[58] Field of Search................ 252/455 Z; 208/111

[56] References Cited
UNITED STATES PATENTS

| | | | |
|---|---|---|---|
| 3,366,578 | 1/1968 | Michalko | 252/455 Z |
| 3,640,905 | 2/1972 | Wilson, Jr. | 252/455 Z |
| 3,686,121 | 8/1972 | Kimberlin, Jr. et al. | 252/455 Z |

Primary Examiner—C. Dees

[57] ABSTRACT

A hydrocarbon conversion catalyst is prepared by mixing about 10–90%wt of channel pore structure zeolite with about 90–10%wt of three-dimensional pore structure zeolite, decationizing the zeolites either before or after mixing to reduce the alkali metal content to less than about 0.5%wt, then incorporating a catalytic amount of a hydrogenation metal component into the mixed zeolites.

9 Claims, No Drawings

HYDROCARBON CONVERSION CATALYST

RELATED APPLICATIONS

This application is related to applicant's two copending applications, Ser. No. 298,898 and Ser. No. 298,897, now U.S. Pat. No. 3,830,724, both filed on Oct. 19, 1972, relating to hydroisomerization and hydrocracking processes respectively.

BACKGROUND OF THE INVENTION

1. Field of the Invention

This invention relates to certain mixed crystalline aluminosilicate base hydrocarbon conversion catalysts and their preparation.

2. Description of the Prior Art

Zeolites are porous rigid crystalline aluminosilicates with ion-exchange capability and are well known in the art. They may be roughly divided into two general classes: (a) channel pore structure zeolites; and (b) three-dimensional pore structure zeolites. This classification depends on the direction of the wide and therefore catalytically active pores of the zeolite. The channel pore structure zeolites include L-sieve, omega-sieve and mordenite. The three-dimensional pore structure zeolites include X-sieve, Y-sieve and natural faujasite. The crystal structure of synthetic zeolite L is discussed by Barrer and Villiger in Zeitschrift fue Kristallographie, Vol. 128 (March, 1969) pp. 352–370. The crystal structure of zeolites A,X,Y and mordenite are discussed by Breck, D.W. in J.Chem. Ed., Vol. 41,(Dec., 1964) pp. 678–689.

Various zeolites are well-known as hydrocarbon conversion catalysts and catalyst components. Type X and Y zeolites can be used as catalytic-cracking catalysts without adding a hydrogenation metal component. When a hydrogenation-cracking catalyst is desired a hydrogenation component selected from Group VIII and Group VIB metals may be combined with the zeolite. The Group VIII noble metals, especially palladium and platinum, and the iron group metals, especially cobalt and nickel, combined with the Group VIB metals, especially molybdenum and tungsten, supported on X and Y zeolites, and particularly ultrastabilized Y-sieve, are well known. Normal paraffin isomerization processes using hydrogen-mordenite catalysts are also well known. For example, Benesi, U.S. Pat. No. 3,190,939 relates to a process for isomerizing $C_5$–$C_6$ hydrocarbons utilizing a hydrogen-mordenite having incorporated therein a metal selected from Group IB, Group VIB, Group VIII and mixtures thereof.

A large number of zeolites containing manganese ions are disclosed as hydrocarbon conversion catalysts by Plank et al. in U.S. Pat. No. 3,264,208.

Mixed zeolites having the same crystal structure have been used as hydrocarbon conversion catalyst components, particularly when mixed with an amorphous silica-alumina matrix. For example, Bertolacini et al. U.S. Pat. No. 3,597,349 relates to a physical particulate mixture of ultrastable aluminosilicate-containing silica-alumina and cation-exchanged Y-type molecular sieves. Kimberlin et al., U.S. Pat. No. 3,686,121 relates to a hydrocarbon conversion catalyst containing a mixture of zeolites having essentially the same crystal structure, but having substantially different silica-alumina molar ratios.

Several crystalline aluminosilicates which are essentially free of hydrogenation activity are said to be useful as reforming catalysts in Coonradt et al., U.S. Pat. No. 3,533,939. The catalyst compositions disclosed may be used alone or in combination with each other if the pore size is greater than about 6 A units. Such zeolites include, e.g., Zeolite L, faujasite, Zeolites X and Y, and the like, regardless of pore structure.

SUMMARY OF THE INVENTION

An improved hydrocarbon conversion catalyst is prepared by physically mixing about 10–90%wt of channel pore structure zeolite with about 90–10%wt of three-dimensional pore structure zeolite, decationizing the zeolites to reduce the alkali metal content to less than about 0.5%wt either before or after mixing the zeolites, then incorporating a catalytic amount of a hydrogenation metal component into the mixed zeolites and drying and calcining the catalyst. The preferred three-dimensional pore structure zeolite is stablized Y-sieve and the preferred channel pore structure zeolites are L-sieve and mordenite. Preferably, the hydrogenation metal component is selected from Group VIII and Group VIB metals.

DETAILED DESCRIPTION

The present invention relates to a process for the preparation of a hydrocarbon conversion catalyst by physically mixing a channel pore structure zeolite with a three-dimensional pore structure zeolite before incorporating a catalytic amount of a hydrogenation metal component into the mixed zeolites. Surprisingly, catalysts having a hydrogenation metal component supported on mixed base channel pore structure/three-dimensional pore structure zeolites are superior in activity and selectivity to comparable mixtures of catalysts having a comparable hydrogenation metal component supported on unmixed channel pore structure and three-dimensional pore structure zeolites. Although the reasons for this observed synergistic effect on hydrocarbon conversion reactions are not understood, it could result in part from a certain degree of selective incorporation of the hydrogenation metal component into one or another of the different pore structure zeolites or its preferential deposition at the interface between grains of different types of zeolites.

This method of preparing catalysts is generally applicable to mixtures of channel pore structure zeolites and three-dimensional pore structure zeolites. Examples of channel pore structure zeolites include L-sieve, omega-sieve and mordenite. Especially preferred from this group are L-sieve and mordenite. Examples of three-dimensional pore structure zeolites include X-sieve, Y-sieve and natural faujasite. Of these, Y-sieve is especially preferred. Other three-dimensional pore structure zeolites include A-sieve which is less desirable as a catalyst support because of its smaller pore size openings.

The improvement realized from this method of catalyst preparation results from mixing about 10–90%wt of channel pore structure zeolite with about 90–10%wt of three-dimensional pore structures zeolite. The composition of the physical mixture of zeolites can be varied within this broad range to obtain optimum results and the optimum mixture will vary depending on the hydrocarbon conversion process in which the catalyst is used. Generally mixtures within the range of 25–75%wt of each component are preferred.

Methods for producing the various channel pore structure and three-dimensional pore structure zeolites are well known (see, e.g., U.S. Pat. No. 3,216,789 — "L;" U.S. Pat. No. 3,130,007 — "Y;" U.S. pat. No. 3,531,243 — mordenite). Suitable zeolites are commercially available. In some instances such zeolites may have a sufficiently low alkali or alkaline earth metal content to be used directly. In other instances, it will be necessary to decationize the zeolites to reduce the alkali and/or alkaline earth metal content to less than about 0.5%wt before incorporating the hydrogenation metal component or components into the mixed zeolites. This decationization step may be accomplished either before or after mixing the channel pore structure and three-dimensional pore structure zeolites.

According to the present invention, alkali metal ions in the zeolite structure are first substantially replaced by hydrogen ions. This is suitably done by ammonium ion exchange followed by thermally driving off ammonia. Aqueous ammonium salt solutions, such as for example, ammonium nitrate, carbonate, sulfate, halides, etc., are suitable for ion exchange. In most cases, multiple exchanges are desirable. The exchange is carried out by any conventional exchange procedure, either batchwise of continuous and preferably at elevated temperatures in the range of 100° C, as for example, by refluxing the zeolite in an exchange solution. Batchwise exchange may be carried out by slurrying the zeolite with an appropriate ammonium compound such as aqueous 2 M ammonium nitrate, separating the solution by filtration or settling, then washing with water. This procedure is repeated several times. While it is necessary to reduce the alkali and/or alkaline earth metal content of the mixed zeolites to less than about 0.5%wt to obtain a suitable hydrocarbon conversion catalyst, additional benefits are realized by reducing the alkali and/or alkaline earth metal content even lower. Preferably, the zeolites will be decationized to reduce the alkali content to less than about 0.1%wt.

The hydrogenation metal component can be incorporated into the mixed zeolite support by either impregnation, i.e., by adding a solution containing the desired amount of hydrogenation metal component to the mixed zeolite and evaporating the solvent or by ion-exchange, i.e., by contacting the mixed zeolite with a solution containing sufficient quantity of hydrogenation metal component at a temperature and for a time sufficient to replace cations within the zeolite structure with the desired hydrogenation metals. This method of incorporation is generally preferred and is exemplified below.

The catalysts of the invention are suitable for use in various hydrocarbon conversion processes such as isomerization, hydroisomerization, hydrogenation, dealkylation, ring opening, cracking and hydrocracking. For many catalytic applications these mixed zeolite supports are composited with hydrogenation metal components such as metals of Group VIB (especially Mo, W), Group VIII (especially Ni, Co, Pt and pd) of the Periodic Table of Elements. Noble metals of Group VIII (Pt and Pd) are especially suitable for hydroisomerization. Nickel-tungsten composites are especially suited for hydrocracking. The hydrogenation metals can be composited with the zeolite by various means known in the art. Platinum, for instance, is conveniently incorporated by ion-exchange of the zeolite with aqueous tetramine platinous chloride solution in the presence of ammonium nitrate. When noble metals of Group VIII are used, it is preferred that the metal content be about 2%wt or less. A composite containing 0.1–1.0%wt platinum or palladium on the mixed zeolite bases of the invention provides a highly active and efficient hydroisomerization catalyst. A composite containing from about 10–40%wt Group VIII and Group VIB metals, and especially about 5–30%wt nickel and about 0.05–10%wt tungsten provides an active and stable hydrocracking catalyst.

After the metal compounds have been deposited the carrier is usually dried at an elevated temperature and subsequently calcined. The calcination is usually carried out in an oxygen-containing gas, preferably air. The calcination temperature is raised in stages to progressively higher levels and preferably will not exceed 550° C.

Catalysts prepared according to the invention are conveniently used in the form of discrete particles, such as granules, extrudates, pellets and the like, usually ranging in size from about one-sixteenth inch to about one-fourth inch in average diameter. These particles are preferably disposed in a stationary bed within a suitable reactor capable of withstanding high pressure. Of course, smaller catalyst particles may be used in fluidized or slurry reactor systems. The catalyst may also be composited with a refractory oxide, such as by copelleting. This is particularly suitable where the catalysts are to be used in a fixed bed of discrete particles in which hardness and resistance to attrition are desirable. For example, pellets comprising about 25%wt alumina and about 75%wt mixed-zeolites having an incorporated hydrogenation metal component, can be used as isomerization catalysts. However, the concentration of zeolite in relation to the concentration of refractory oxide can be varied as desired. Mixtures of refractory oxides, such as silica-alumina, can also be used if desired.

Feed to a hydroisomerization process using catalysts of the invention can be a substantially pure normal paraffin having from four through seven carbon atoms, mixtures of such normal paraffins, or hydrocarbon fraction rich in such normal paraffins. Suitable hydrocarbon fractions are the $C_4$ to $C_7$ straight-run fractions of petroleum. The catalysts can also be used in the isomerization of xylenes, e.g., the conversion of ortho and meta-xylenes to para-xylenes.

Hydroisomerization of normal paraffins over solid catalysts is conducted at a temperature in the range from about 200° to 350° C and preferably from about 225° to 315° C. At lower temperatures, conversion of normal paraffins is generally too low — despite a more favorable thermodynamic equilibrium — to be practical, although selectivity to isoparaffins is high. At higher temperatures, conversion of normal paraffins is increased; however, more cracking is encountered and selectivity to isoparaffin is lower as a result.

The isomerization reaction can be conducted over a wide range of space velocities, but in general the space velocity is in the range from about 0.5 to 10 and preferably from about 1 to 5. In general, conversion of normal paraffins decreases with an increase in weight hourly space velocity (WHSV), although selectivity to the isoparaffin is increased.

The isomerization reaction is carried out in the presence of hydrogen; however, there is little or no net consumption of hydrogen in the process. Any consumption of hydrogen is the result of hydrocracking reactions and it is preferred to keep such reactions to a minimum. The function of the hydrogen is primarily to improve catalyst life, apparently by preventing polymerization of intermediate reaction products which would otherwise polymerize and deposit on the catalyst. A hydrogen to hydrocarbon mole ratio of from about 1:1 to 25:1 and preferably from about 2:1 to 15:1 is used. It is not necessary to employ pure hydrogen since hydrogen-containing gases, e.g., hydrogen-rich gas from the catalytic reforming of naphthas, are suitable. Total pressure is in the range from about atmospheric to 1,000 pounds per square inch gauge (psig) and preferably from about 200 to 600 psig.

Suitable feedstocks for hydrocracking processes employing catalysts of the invention include any hydrocarbon boiling above the boiling range of the desired products. For gasoline production, hydrocarbon distillates boiling in the range of about 200°–500° C are preferred. Such distillates may have been obtained either from distillation of crude oils, coal tars, etc., or from other processes generally applied in the oil industry such as thermal, catalytic, or hydrogenative cracking, visbreaking, deasphalting, deasphaltenizing or combinations thereof. Since these catalysts are active and stable in the presence of nitrogen and sulfur compounds, hydrofining the feedstock is optional.

Operating conditions appropriate for a hydrocracking process using the present catalyst include temperatures in the range of about 260° C to 450° C, hydrogen partial pressures of about 500 to 2,000 psi, liquid hourly space velocities (LHSV) of about 0.2 to 10, preferably 0.5 to 5, and hydrogen/oil molar ratios of about 5 to 50.

Feed can be introduced into the reaction zone as a liquid, vapor or mixed liquid-vapor phase depending upon the nature, pressure and amount of hydrogen mixed with the feed and the boiling range of the feedstock utilized. The hydrocarbon feed, including fresh as well as recycle feed, is usually introduced into the reaction zone with a large excess of hydrogen since the hydrocracking is accompanied by a rather high consumption of hydrogen, usually of the order of 500–2,000 standard cubic feet of hydrogen per barrel of feed. Again, any suitable hydrogen containing gas which is predominantly hydrogen can be used. The hydrogen rich gas may optionally contain nitrogen contaminants from a feed pretreating process.

The following examples further illustrate the practice and advantages of the invention.

EXAMPLE I

The mixed zeolite catalyst supports of the invention are decationized by any convenient method such as ion-exchange to reduce the alkali metal content of the zeolite to less than about 0.5%wt before incorporating the hydrogenation metal component. The decationization process can be done either before or after mixing the three-dimensional and channel pore structure zeolites. This example illustrates a method of reducing the alkali metal content of the zeolites before they are mixed.

An ultrastabilized Y-sieve produced by Davison Chemical Division of W. R. Grace Co., and hereinafter designated as D-Y, was selected as a three-dimensional pore structure zeolite. This zeolite contained about 2%wt sodium as purchased. This stabilized Y-sieve was decationized by contacting for instance, 200 grams of the Y-sieve five times with 1,000 ml of boiling 1 M aqueous ammonium nitrate solution for 1 hour. Finally the treated zeolite was dried at 100° C for at least 2 hours, and then calcined in air for 2 hours each at 200°, 350° and 500° C.

Linde SK–45 L-sieve produced by Linde Division of Union Carbide, and hereafter designated as L-L, was selected as one example of a channel pore structure zeolite. This zeolite contained about 10%wt potassium as purchased. Its silicon-to-aluminum weight ratio was greater than 3.1. It was decationized by contacting for instance 100 grams of the zeolite with 1,000 ml of boiling 2 M aqueous ammonium nitrate solution for 2 hours, given a staged calcination to 500° C for 2 hours at each temperature level and repeating this procedure four times. The residual potassium content was 0.06%wt.

A mordenite zeolite produced by Norton Co., and hereafter designated as N-M, was selected as another example of a channel pore structure zeolite. This zeolite contained 0.25%wt sodium as purchased. It was used as such or further decationized to a residual sodium content of about 0.02%wt by contacting 100 grams of the zeolite with 1,000 ml of 1 M aqueous ammonium nitrate solution for 1 hour at boiling temperature.

EXAMPLE II

Two sets of mixed zeolite catalyst supports were prepared. Each set contained 0, 25, 50, 75 and 100%wt of three-dimensional pore structure D-Y zeolite from Example I mixed with a channel pore structure zeolite. One set contained L-L zeolite (from Example I) as the second zeolite and the other contained N-M zeolite (from Example I). A hydrogenation metal component consisting of 0.3%wt platinum was incorporated into the various mono- or dicomponent supports by stirring the zeolite powders at room temperature for at least 1 day in aqueous about 0.01 M tetrammine platinous chloride solution which was 2 molar in ammonium nitrate. This treatment reduced the sodium content of the mordenite (N-M) to 0.03%wt and of the D-Y zeolite to 0.08%wt. The metal-containing powder zeolites were then successively dried and calcined in air at 100°, 200°, 350° and 500° C for 2 hours at each temperature.

EXAMPLE III

The two sets of catalysts prepared according to Example II and a commercial isomerization catalyst consisting of about 0.3%wt Pt on mordenite with an alumina binder were diluted with quartz (about 80%wt) and evaluated in a laboratory unit as hydrocarbon isomerization catalysts. Normal hexane was used as the hydrocarbon. The isomerization reaction was carried out at 450 psig, 1.0 weight hourly space velocity (WHSV) and 2.2 hydrogen to n-hexane molar ratio. Prior to introducing the feed, the catalysts were pretreated by contact with about 700 ml hydrogen per gram of catalyst per hour for 0.5 hour at 260° C and about 30 psig. The isomerization reaction was carried out for 4 hours at both 250° C and 260° C. Results of these tests are shown in Table I.

Generally, the mixed zeolite supports show synergism with respect to activity and 2,2-dimethyl butane production. In particular, the 25% and 50% mordenite (N-M) or L-sieve (L-L) mixed supports are substantially more active and more selective at comparable conversion levels than the commercial mordenite isomerization catalyst.

(N-M) used in preparing the mixed zeolite supports are both more active than the stabilized Y-sieve catalyst in processing the pentane feedstock. All three catalysts are out-performed, however, by the mixed supports Table I

| Catalyst | Conversion Temperature, °C | $C_1$-$C_4$, %wt | i-$C_5$, %wt | n-$C_5$, %wt | 2,2-DMB %wt | 2,3-DMB 2 MP, %wt | 3 MP, %wt | MCP/ CH, %wt | n-$C_6H_{14}$, %wt |
|---|---|---|---|---|---|---|---|---|---|
| Commercial Pt/Mordenite | 250 | 0.9 | 0.3 | 0.1 | 5.8 | 37.8 | 17.5 | 0.2 | 37.4 |
|  | 260 | 3.3 | 0.9 | 0.4 | 11.4 | 42.3 | 16.9 | 0.2 | 24.5 |
| Mordenite (N-M) | 250 | 0.9 | 0.3 | 0.15 | 7.15 | 31.6 | 14.1 | 0.3 | 45.5 |
|  | 260 | 3.5 | 1.3 | 0.4 | 12.8 | 37.5 | 20.0 | 0.2 | 24.3 |
| Ultrastabilized Y (D-Y) | 250 | 1.0 | 0.3 | 0.1 | 14.0 | 43.5 | 20.5 | 0.3 | 20.3 |
|  | 260 | 2.1 | 0.6 | 0.2 | 14.8 | 40.3 | 21.4 | 0.3 | 20.3 |
| 25% N-M, 75% D-Y | 250 | 1.9 | 0.7 | 0.4 | 17.35 | 40.1 | 19.6 | 0.2 | 19.75 |
|  | 260 | 3.3 | 1.1 | 0.5 | 17.75 | 39.7 | 19.95 | 0.2 | 17.5 |
| 50% N-M, 50% D-Y | 250 | 2.15 | 0.7 | 0.35 | 16.95 | 40.25 | 19.1 | 0.2 | 20.3 |
|  | 260 | 2.7 | 1.1 | 0.5 | 16.1 | 40.45 | 19.95 | 0.2 | 19.0 |
| 75% N-M, 25% D-Y | 250 | 3.5 | 1.0 | 0.6 | 14.25 | 36.15 | 20.3 | 0.1 | 24.1 |
|  | 260 | 6.1 | 2.1 | 1.1 | 15.3 | 37.2 | 19.7 | 0.1 | 18.4 |
| L-Sieve (L-L) | 250 | 2.3 | 0.3 | 0.2 | 2.5 | 31.4 | 16.7 | 0.2 | 46.4 |
|  | 260 | 2.5 | 0.4 | 0.2 | 4.0 | 40.8 | 21.7 | 0.2 | 30.2 |
| 25% L-L, 75% D-Y | 250 | 1.5 | 0.3 | 0.1 | 11.1 | 38.2 | 19.2 | 0.2 | 29.4 |
|  | 260 | 2.6 | 0.6 | 0.2 | 15.9 | 39.7 | 19.8 | 0.2 | 21.0 |
| 50% L-L, 50% D-Y | 250 | 2.1 | 0.5 | 0.3 | 10.0 | 41.9 | 21.0 | 0.2 | 24.2 |
|  | 260 | 2.8 | 0.7 | 0.2 | 12.2 | 41.8 | 21.0 | 0.2 | 21.1 |
| 75% L-L, 25% D-Y | 250 | 1.4 | 0.3 | 0.2 | 6.4 | 42.7 | 21.7 | 0.2 | 27.1 |
|  | 260 | 2.2 | 0.6 | 0.2 | 9.9 | 43.2 | 21.7 | 0.2 | 22.0 |

DMB- dimethyl butane
MP- methyl pentane
MCP- methyl cyclopentane
CH- cyclohexane

EXAMPLE IV

The N-M/D-Y set of catalysts from Example II was diluted with quartz (about 80%wt) and used to isomerize normal pentane under the same operating conditions used in Example III. The commercial isomerization catalyst used in Example III was also tested for comparison. The catalysts were pretreated by contact with hydrogen as in Example III. The isomerization reaction was again carried out for 4 hours at both 250° C and 260° C. Results of these tests are shown in Table II.

Table II

| Catalyst | Conversion Temperature, °C | $C_1$-$C_4$, %wt | i-$C_5$, %wt | n-$C_5$, %wt |
|---|---|---|---|---|
| Commercial Pt/Mordenite | 250 | 0.6 | 40.8 | 58.6 |
|  | 260 | 2.8 | 59.4 | 37.8 |
| Mordenite (N-M) | 250 | 0.5 | 37.6 | 61.9 |
|  | 260 | 1.7 | 57.6 | 40.7 |
| Ultrastabilized Y (D-Y) | 250 | 0.2 | 37.2 | 62.6 |
|  | 260 | 0.4 | 47.6 | 52.0 |
| 25% N-M, 75% D-Y | 250 | 0.9 | 47.7 | 51.4 |
|  | 260 | 2.8 | 61.5 | 35.7 |
| 50% N-M, 50% D-Y | 250 | 1.6 | 55.0 | 43.4 |
|  | 260 | 3.1 | 62.0 | 34.9 |
| 75% N-M, 25% D-Y | 250 | 0.6 | 47.2 | 52.2 |
|  | 260 | 1.1 | 59.2 | 39.7 |

The stabilized Y-sieve catalyst alone yields the lowest conversion to the isomer both at 250° C (37%) and even more so, by comparison, at 260° C (47%). The commercial mordenite catalyst and the mordenite which show synergism for all base compositions tested. The 50/50 N-M/D-Y mixed base catalyst produces the most favorable results, particularly at 250° C where conversion is high (55% isomer) and selectivity comparatively good (1.6% wt gas yield).

EXAMPLE V

A 50/50 n-hexane/n-pentane mixed feedstock was processed for closer approximation of a commercial feedstock under the same conditions employed in Example III, except that reaction temperatures of 245° C and 255° C were used. Three catalyst supports were employed in the evaluation, namely, mordenite (N-M), stabilized Y-sieve (D-Y) and a 50/50 mixture of the two supports. All three supports were decationized as in Example I and promoted by 0.3%wt platinum incorporated as in Example II. For comparison, a 50/50 mixture of the stabilized Y-sieve and mordenite catalysts was tested also. Results of these tests are shown in Table III.

Conversion to isomers with the mixed base catalyst greatly exceeded the yields obtained from the mordenite and stabilized Y-supported catalysts at both temperature levels, particularly when considering the isopentane and 2,2-dimethyl butane yields. The mechanical mixture of monocomponent catalysts on the other hand yielded a product the composition of which was close to the arithmetic mean of the product components obtained from the mordenite and Y-sieve supported catalysts.

Table III

| Catalyst | Residual Sodium, %wt | Conversion Temperature, °C | C₁-C₄, %wt | i-C₅, %wt | n-C₅, %wt | 2,2-DMB, %wt | 2,3-DMB 2 MP, %wt | 3 MP, %wt | n-C₆H₁₄, %wt |
|---|---|---|---|---|---|---|---|---|---|
| Mixed bases (50%N-M/50% D-Y) | 0.06 | 245 | 1.2 | 20.2 | 29.7 | 5.9 | 20.2 | 9.9 | 12.9 |
|  |  | 255 | 2.2 | 27.0 | 22.7 | 7.4 | 20.3 | 10.3 | 10.1 |
| Ultrastabilized Y (D-Y) | 0.08 | 245 | 0.2 | 11.7 | 39.2 | 4.0 | 19.6 | 10.4 | 14.9 |
|  |  | 255 | 0.4 | 15.2 | 35.5 | 6.0 | 19.8 | 10.7 | 12.4 |
| Mordenite (N-M) | 0.03 | 245 | 0.7 | 16.9 | 34.0 | 3.5 | 16.7 | 8.1 | 20.1 |
|  |  | 255 | 1.3 | 22.0 | 28.4 | 5.3 | 18.7 | 9.3 | 15.0 |
| 50/50 Mechanical Mixture of Monocomponent Catalysts | 0.05 | 245 | 0.4 | 15.2 | 36.7 | 4.7 | 17.5 | 8.8 | 16.7 |
|  |  | 255 | 0.7 | 18.7 | 31.7 | 6.0 | 19.4 | 9.6 | 13.9 |

DMB- dimethyl butane
MP- methyl pentane

EXAMPLE VI

A mixed zeolitic-based catalyst consisting of 66%wt Norton mordenite (N-M) and 34%wt stabilized Y-sieve (D-Y) and 0.3%wt platinum was prepared as in Example II. This catalyst and the commercial mordenite supported isomerization catalyst used in the previous examples were employed to process a feed which simulated a typical commercial feed. The commercial catalyst was activated by exposure to an atmosphere of 50–60% relative humidity at room temperature for 2 days. A saturated calcium nitrate solution was used to provide the desired vapor pressure.

The isomerization reaction was carried out under the same conditions employed in Example III. The isomerization test was conducted at 260° C for the first 3 days of each run, then the operating temperature was dropped to 250° C for an additional 2 days. Conversion levels were continuously checked by means of a gas liquid chromatograph. Analyses were obtained by mass balance on the second and fourth day of the run. Test results are shown in Table IV.

Gas make ($C_1$–$C_4$) for both catalysts is below 1%wt at 250° C and below 3%wt at 260° C. The mixed zeolitic-based catalyst produces high iso to normal pentane ratios, namely, 1.30 at 250° C and 2.03 at 260° C as compared to 0.84 and 1.65 respectively for the commercial mordenite catalyst. The 2,2-dimethyl butane yield is higher for the mixed zeolitic-based catalyst (11.3%wt at 250° C; 11.8%wt at 260° C) than for the commercial mordenite catalyst (8.96 at 250° C; 10.40 at 260° C). No change in catalytic activity was noticeable for either catalyst during the test period despite the presence of naphthenes in the feedstock.

Table IV

|  | Feed | 66% N-M, 34% D-Y Mixed Zeolitic Base Catalyst | | Commercial Pt/Mordenite Catalyst | |
|---|---|---|---|---|---|
| Run temperature, °C |  | 250 | 260 | 250 | 260 |
| $C_1$, %wt |  | 0.06 | 0.17 | 0.05 | 0.17 |
| $C_2$ |  | 0.06 | 0.27 | 0.06 | 0.27 |
| $C_3$ |  | 0.28 | 0.87 | 0.20 | 0.85 |
| i-$C_4$ |  | 0.37 | 0.90 | 0.37 | 1.04 |
| n-$C_4$ |  | 0.22 | 0.60 | 0.15 | 0.66 |
| i-$C_5$ | 2.7 | 23.38 | 27.01 | 18.01 | 27.09 |
| n-$C_5$ | 37.1 | 17.97 | 13.28 | 21.34 | 16.46 |
| 2,2-DMB | 2.8 | 11.31 | 11.84 | 8.96 | 10.40 |
| CP | 3.6 | 1.96 | 1.85 | 2.06 | 1.76 |
| 2,3-DMB | 3.2 | 4.69 | 4.66 | 5.09 | 4.60 |
| 2-MP | 19.0 | 17.78 | 17.67 | 18.30 | 16.57 |
| 3-MP | 11.2 | 11.24 | 11.16 | 11.65 | 10.40 |
| n-$C_6$ | 17.8 | 9.40 | 9.10 | 11.98 | 8.66 |
| MCP | 1.7 | 0.89 | 0.49 | 1.29 | 0.79 |
| Cyclohexane | 0.4 | 0.28 | 0.10 | 0.37 | 0.19 |
| Benzene | 0.4 |  |  |  |  |
| $C_7$+ | tr. | 0.11 | 0.03 | 0.12 | 0.11 |

DMB – dimethyl butane
CP – cyclopentane
MP – methyl pentane
MCP – methyl cyclopentane

EXAMPLE VII

A stabilized L-sieve (L-S) was obtained from Linde SK-45 zeolite, having a Si/Al weight ratio greater than 3.1, by ion-exchanging for instance 100 grams of zeolite three times with 1,000 ml of 2 M aqueous ammonium nitrate solution for 2 hours each at boiling temperature and staged calcination in air at 100°, 200°, 350° and 500° C for 2 hours at each of the four temperature levels. The zeolite was the ion-exchanged with 1 M buffered aqueous rare earth (mixture) nitrate solution at boiling temperature, given a staged calcination at 100°, 200°, 350°, 500° and 700° C followed by four additional combined ammonium nitrate exchange treatments and staged clacinations, as before, to 500° C. The exchanged zeolite had a benzene sorption capacity of 7%wt at room temperature, a residual potassium content of 0.05%wt and contained less than 0.3%wt rare earths. The silicon/aluminum weight ratio had increased by 40% (from about 3.2 to 4.5) as a result of this treatment.

A 50/50 mixture of the stabilized L-sieve (L-S) and decationized Davison ultrastabilized Y-sieve (0.18%wt sodium) was finally exchanged four times at boiling temperature with a saturated aqueous nickel acetate solution containing approximately stoichiometric amounts of ammonium metatungstate to incorporate 16.6%wt nickel and 1.2%wt tungsten.

The finished catalyst powder was pelletized and crushed to obtain granules of 8 to 14 mesh (US) and then was clacined in air for 2 hours each at 200°, 300° and 500° C. It had an average bulk density of 0.59 g/ml and a benzene sorption capacity of 8.1%wt.

EXAMPLE VIII

The catalyst from Example VII was tested in two, once-through hydrocracking process runs (i.e., no recycle) at 1,500 psig and a 10 to 1 hydrogen-to-oil molar ratio for 75% conversion of a gas-oil feedstock to material boiling less than 199° C. The feedstock was a hydrotreated(4.4ppm residual nitrogen) mixed straight run/catalytically cracked/coker gas oil having an API gravity of 31.5°, an estimated molecular weight of 230, an aromatics content of 37%v, and a boiling range of about 390° to 690° F (0.5%wt sulfur was added to the feed). In both cases the catalyst was pretreated in situ at atmospheric pressure with a gas mixture of 10% $H_2S$ in hydrogen flowing at a rate of about 3,000 volume/volume/hour. Temperature was raised from 200° to 500° C at about 50° C per half hour while sulfiding the catalyst and maintained at 500° C for 3 hours prior to introducing feed at the desired lower temperature.

One hydrocarcking test was conducted at 1.0 LHSV. The catalyst was very active initially, reaching plateau conditions (i.e., relatively stable conversion temperatures) at 320° C after only 48 days of operation. The catalyst operated stably at this conversion temperature for the remaining 21 days of the test. Yield and product quality data are shown in Table V.

Also included in Table V for comparison are hydrocracking test results obtained on the same feed and under similar operating conditions for nickeltungsten catalysts supported on stabilized L-sieve and stabilized Y-sieve unmixed zeolites. Although these unmixed zeolite catalysts contained somewhat different metal contents, and the stabilized L-sieve catalyst was operated at a slightly different space velocity (1.5 LHSV), the test results indicate the improvement that can be achieved by utilizing a mixed zeolite base catalyst. The mixed zeolite base catalyst showed surprisingly good selectivity to heavy gasoline (73.8%wt) over a wide temperature range (from 285° to 320° C). The heavy gasoline fraction amounted to only 67.7%wt for the stabilized Y-sieve base catalyst at around 330° C (2.0 LHSV) and to only 63.7%wt for the stabilized L-sieve base catalyst at 343° C and higher (1.5 LHSV). As to product quality, the mixed base catalyst produced a low paraffin concentration in the reformer feed as expressed by a paraffin/naphthene/aromatics (P/N/A) concentration of 27/63/10%v as compared to 30/57.5/12.5%v for stabilized Y-sieve base at a 10° C higher temperature, and 25/63/12%v for stabilized L-sieve base at a more than 20° C higher temperature.

The second test run was conducted at 2.0 LHSV. Doubling the space velocity required a 20° C higher conversion temperature and led to a less stable operation. This indicates that hydrocracking processes over mixed zeolitic supported catalysts should be limited to about 1.5 LHSV. Otherwise, the 2.0 LHSV test run showed good yields and product quality. The heavy gasoline fraction amounted to 70.1%wt between 340° and 345° C with a P/N/A split of 27/59/14%v. The shape selective features were obviously preserved.

Table V

| Catalyst base<br>Promoter metals, %wt | Stabilized<br>L-Sieve (L-S)<br>12.0%wt Ni<br>2.8%wt W | 50% L-S / 50% D-Y<br>16.6%wt Ni<br>1.2%wt W | | Stabilized<br>Y-Sieve (D-Y)<br>22.7%wt Ni<br>1.5%wt W |
|---|---|---|---|---|
| Space velocity, v/v/hr | 1.5 | 1.0 | 2.0 | 2.0 |
| Operating temperature,°C | 343–366 | 285–320 | 340–345 | 327–330 |
| Products, %wt | | | | |
| $C_1$-$C_3$ | 2.6 | 1.2 | 1.9 | 1.9 |
| Total $C_4$ | 10.7 | 7.5 | 8.3 | 9.1 |
| $C_5$-$C_6$ | 23.0 | 17.5 | 19.7 | 21.3 |
| $C_7$-199°C | 63.7 | 73.8 | 70.1 | 67.7 |
| Iso/normal ratios, wt | | | | |
| $C_4$ | 2.0 | 3.0 | 2.1 | 2.5 |
| $C_5$ | 7.7 | 7.1 | 9.7 | 8.1 |
| $C_6$ | 13 | 15 | 21 | 15 |
| Reformer feed quality, %v | | | | |
| Paraffins | 25 | 27 | 27 | 30 |
| Naphthenes | 62.5 | 63 | 59 | 57.5 |
| Aromatics | 12.5 | 10 | 14 | 12.5 |

I claim as my invention:

1. A method of preparing a mixed crystalline aluminosilicate zeolite hydroconversion catalyst which comprises first physically mixing about 10–90%wt of channel pore structure zeolite selected from the group consisting of L-sieve and mordenite with about 90–10%wt of three-dimensional pore structure Y-sieve zeolite, decationizing the zeolites either before or after mixing to reduce the alkali metal content to less than bout 0.5%wt, then incorporating a catalytic amount of a hydrogenation metal component selected from the group consisting of Group VIII and Group VIB metals of the periodic chart into the mixed zeolites and drying and calcining the catalyst.

2. The method of claim 1 wherein about 25–75%wt of L-sieve or mordenite are physically mixed with about 75–25%wt of Y-sieve zeolite and the hydrogenation metal component is selected from the group consisting of platinum, palladium, nickel, cobalt, molybdenum and tungsten.

3. The method of claim 1 wherein the zeolites are decationized to reduce the alkali metal content to less than about 0.1%wt.

4. A hydroconversion catalyst composition consisting essentially of a catalytic amount of a hydrogenation metal component selected from the group consisting of the Group VIII and Group VIB metals of the periodic chart incorporated into a physically mixed zeolite support after said support is mixed, said zeolite mixture consisting of about 10–90%wt of channel pore structure zeolite selected from the group consisting of L-sieve and mordenite and about 90–10%wt of three-dimensional pore structure Y-sieve zeolite, and having an alkali metal content of less than about 0.5%wt.

5. The composition of claim 4 wherein about 25–75%wt of L-sieve or mordenite are physically mixed with about 75–25%wt of Y-sieve zeolite and the hydrogenation metal component is selected from the group consisting of platinum, palladium, nickel, cobalt, molybdenum and tungsten.

6. The composition of claim 4 wherein the alkali metal content of the zeolites is less than about 0.1%wt.

7. The composition of claim 6 wherein the hydrogenation metal component is from about 0.1–1.0%wt platinum or palladium and the mixed zeolites are decationized mordenite and stabilized Y-sieve.

8. The composition of claim 6 wherein the hydrogenation metal component is 5–30%wt nickel and 0.05–10%wt tungsten.

9. The composition of claim 6 wherein the mixed zeolite support consists of about 25–75% wt of said channel pore structure zeolite and about 75–25% wt of said three-dimensional pore structure zeolite.

* * * * *